United States Patent [19]
Oshidari

[11] Patent Number: 5,141,477
[45] Date of Patent: Aug. 25, 1992

[54] PLANETARY GEAR DRIVE WITH INTERMESHING PLANET PINIONS IN MULTISTAGE AUTOMATIC TRANSMISSION

[75] Inventor: Toshikazu Oshidari, Kanagawa, Japan

[73] Assignee: Nissan Motor Co., Ltd., Yokohama, Japan

[21] Appl. No.: 670,868

[22] Filed: Mar. 18, 1991

[51] Int. Cl.$^5$ .............................. F16H 3/66; F16H 3/62
[52] U.S. Cl. .................................. 475/330; 475/780; 475/313; 475/319
[58] Field of Search .............. 475/219, 271, 280, 282, 475/284, 286, 288, 311, 317, 323, 252, 313, 319, 325, 338, 329, 330

[56] References Cited

U.S. PATENT DOCUMENTS

| | | | |
|---|---|---|---|
| 1,454,578 | 5/1923 | Towler | 475/252 X |
| 2,838,960 | 6/1958 | Simpson | 475/280 |
| 2,865,230 | 12/1958 | Simpson | 475/280 X |
| 2,873,624 | 2/1959 | Simpson | 475/280 |
| 2,873,625 | 2/1959 | Simpson | 475/284 |
| 3,031,001 | 5/1962 | Simpson | 475/280 |
| 3,486,398 | 12/1969 | Waclawek | 475/280 X |
| 4,483,215 | 11/1984 | Ishimaru et al. | 475/280 X |
| 4,638,688 | 1/1987 | Hirawa | 475/284 X |

FOREIGN PATENT DOCUMENTS

| | | | |
|---|---|---|---|
| 381538 | 8/1990 | European Pat. Off. | 475/330 |
| 123761 | 10/1978 | Japan | 475/280 |
| 130649 | 6/1986 | Japan | 475/280 |
| 93544 | 4/1987 | Japan | 475/282 |
| 26052 | 1/1989 | Japan | 475/284 |
| 118240 | 5/1990 | Japan | 475/313 |
| 857889 | 12/1960 | United Kingdom | 475/280 |

*Primary Examiner*—Richard Lorence
*Assistant Examiner*—Khoi O. Ta
*Attorney, Agent, or Firm*—Foley & Lardner

[57] ABSTRACT

A multistage automatic transmission has input and output shafts which are coaxially arranged, a first planetary gearset, a second planetary gearset, a plurality of clutches, and first and second brakes. The first planetary gearset includes mutually meshed paired pinions that mesh with a first sun gear and a first ring gear, and a carrier that rotatably carries the mutually meshed paired pinions. The second planetary gearset includes a single type pinion meshed with a second sun gear and a second ring gear, and a second carrier that rotatably carries the single type pinion. The first and second gearset are coaxially aligned between the input and output shafts. The arrangement of the clutches is such that when shifting to any particular neighboring gear, the condition of no more than two of the clutches needs to be changed.

3 Claims, 2 Drawing Sheets

PLANETARY GEAR DRIVE WITH INTERMESHING PLANET PINIONS IN MULTISTAGE AUTOMATIC TRANSMISSION

BACKGROUND OF THE INVENTION

1. Field of the Invention

The present invention relates to a planetary gear drive installed in a multistage automatic transmission.

2. Description of the Prior Art

Usually, a planetary gear drive of an automatic transmission uses two planetary gearsets in series to obtain three or four forward speeds.

Nowadays, however, for achieving a much smoother speed change, more than four forward speeds have been required particularly in the field of high-class cars. For achieving this purpose three planetary gearsets are usually employed. However, in this case, the transmission inevitably becomes bulky.

In order to solve this drawback, an idea has been proposed by U.S. Pat. No. 2,873,625 in which six forward speeds are obtained by only two planetary gearsets.

In order to clarify the task of the invention, the planetary gear drive of the U.S. Patent indentified above will be outlined with reference to FIG. 4 of the accompanying drawings.

The gear drive comprises two coaxially arranged planetary gearsets P11 and P12 which are interposed between input and output shafts "I" and "O". The gearsets are of a single pinion type. The power transmission from the input shaft "I" to the output shaft "O" is achieved by selectively operating four clutches C11, C12, C13 and C14 and two brakes B11 and B12.

Table-1 shows the relation between the conditions of the clutches and the brakes, and the speed selected.

TABLE 1

| Speed selected | C11 | C12 | C13 | C14 | B11 | B12 |
|---|---|---|---|---|---|---|
| Forward 1'st speed | o | x | x | o | x | o |
| Forward 2'nd speed | o | x | o | x | o | o |
| Forward 3'rd speed | o | x | x | o | o | x |
| Forward 4'th speed | o | x | o | x | o | x |
| Forward 5'th speed | x | o | o | o | x | x |
| Forward 6'th speed | x | o | o | x | x | x |
| Reverse | o | o | x | x | x | o |

Note:
o: ON (engaged)
x: OFF (disengaged)

However, due to its inherent construction, the above planetary gear drive has the following drawbacks.

That is, as is understood from Table-1, when the switch between 2'nd and 3'rd speeds, and between 4'th and 5'th speeds is accomplished four ON-OFF switch operations are necessary in the associated cluthes and brakes. However, these four ON-OFF switch operations tend to make a smooth torque change of the output shaft difficult. That is, non-negligible shift shock tends to occur awing such speed changes.

Even when one speed for which the four ON-OFF switch operations are needed is removed to make the gear drive have "five" forward speeds, the remaining one speed causes the undesired shift shock.

SUMMARY OF THE INVENTION

It is therefore an object of the present invention to provide a planetary gear drive which is free of the above-mentioned drawbacks.

According to the present invention, there is provided a planetary gear drive which obtains more than four forward speeds without using more than two ON-OFF switch operations in the associated clutches and brakes.

According to the present invention, there is provided a planetary gear drive for use with a multistage automatic transmission. The planetary gear drive comprises an input shaft; an output shaft; a first planetary gearset including a first sun gear, a first ring gear, a first pinion unit meshed with both the first sun gear and the first ring gear, and a first carrier rotatably carrying the first pinion unit; a second planetary gearset including a second sun gear, a second ring gear, a second pinion unit meshed with both the second sun gear and the second ring gear, and a second carrier rotatably carrying the second pinion unit, the first and second planetary gearsets being arranged in series between the input and output shafts; and an ON-OFF switchable mechanism consisting of first, second, third and fourth clutch means, and first and second brake means, wherein the ON-OFF switchable mechanism is so arranged as to operate the first and second planetary gearsets in such a manner that a switch between any neighboring speeds is achieved by changing the conditions of two of the means of the ON-OFF switchable mechanism and keeping the existing conditions of the remaining means of the mechanism.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
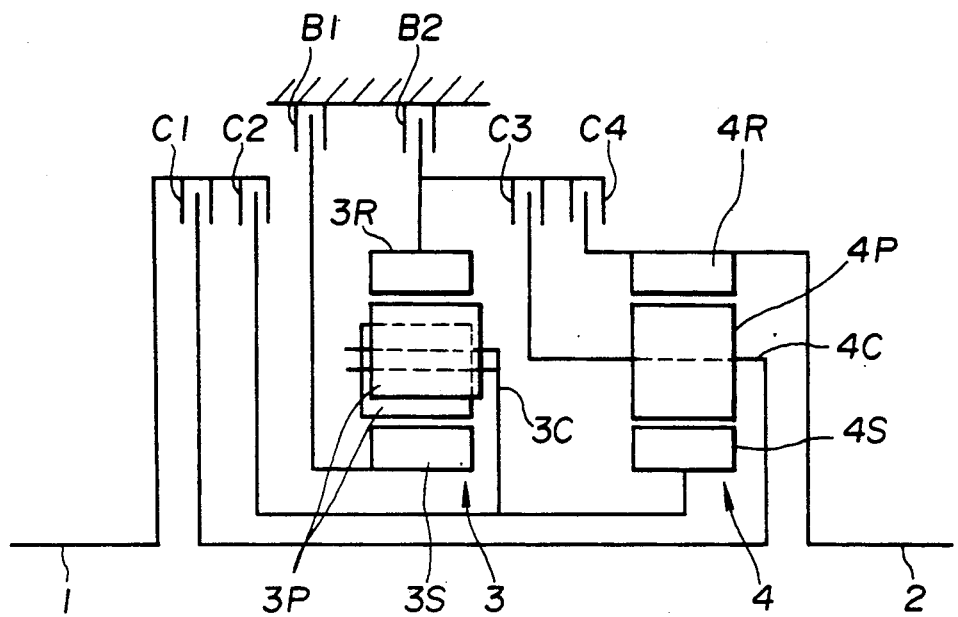
FIG. 1 is a schematic view of a planetary gear drive, which is a first embodiment of the present invention.

Referring to FIG. 1 of the accompanying drawings, there is shown a planetary gear drive of a first embodiment of the present invention.

Designated by numerals 1 and 2 are an input shaft and output shaft, respectively. Designated by numerals 3 and 4 are first and second planetary gearsets which are arranged in series between the input and output shafts 1 and 2.

The first planetary gearset 3 is of a double pinion type, which comprises a first sun gear 3S, a first ring gear 3R, a double pinion unit 3P which includes three sets of paired pinions meshed with both the first sun gear 3S and the first ring gear 3R, and a first carrier 3C which rotatably supports the double pinion unit 3P.

The second planetary gearset 4 is of a single pinion type, which comprises a second sun gear 4S, a second ring gear 4R, a single pinion unit 4P which includes three single pinions meshed with both the second sun gear 4S and the second ring gear 4R, and a second carrier 4C which rotatably supports the single pinion unit 4P.

The first carrier 3C is united with the second sun gear 4S to rotate therewith and is engageable with the input shaft 1 by means of a second clutch C2. The input shaft 1 is engageable with the second carrier 4C by means of a first clutch C1. The second ring gear 4R is united with the output shaft 2 to rotate therewith. The second carrier 4C and the second ring gear 4R are engageable with the first ring gear 3R by means of third and fourth clutches C3 and C4 respectively. The first sun gear 3S can be fixed by means of a first brake B1, and the first ring gear 3R can be fixed by means of a second brake B2.

With the arrangement as mentioned hereinabove, the planetary gear drive of the first embodiment obtains five forward speeds and one reverse, as will be understood from Table-2. In the Table, "o" means engagement of the associated clutch or brake and "x" means disengagement of the same. It is to be noted that "(o)" means engagement of the associated clutch or brake. However, such engagement "(o)" is not necessary because it does not participate the in power transmission for the associated speed. However, for achieving a smooth and quick response when shifting from 4th speed to the 3rd or 5th speeds, where engagement of B1 is required, the engagement "(o)" of B1 in 4th speed is preferable.

TABLE 2

| Speed selected | C1 | C2 | C3 | C4 | B1 | B2 |
| --- | --- | --- | --- | --- | --- | --- |
| Forward 1'st speed | x | o | o | x | o | x |
| Forward 2'nd speed | x | o | x | o | o | x |
| Forward 3'rd speed | o | x | x | o | o | x |
| Forward 4'th speed | o | o | x | x | (o) | x |
| Forward 5'th speed | o | x | x | x | o | o |
| Reverse | x | o | o | x | x | o |

Note:
o: ON (engaged)
x: OFF (disengaged)

In the following, the speed change control will be described with reference to Table-2.

In Forward 1'st speed

When the second clutch C2, the third clutch C3 and the first brake B1 are engaged, the engine power applied through the input shaft 1 and the second clutch C2 to the first carrier 3C is transmitted to the first ring gear 3R using the first sun gear 3S as a counter force receiver. The rotation of the first ring gear 3R is faster than that of the input shaft 1. The rotation power of the first ring gear 3R is transmitted through the third clutch C3 to the second carrier 4C and through the second ring gear 4R to the output shaft 2. Because the second sun gear 4S is integrally rotated with the input shaft 1 through the second clutch C2, the output shaft 2 is rotated in a normal direction at a first speed reduction ratio. Thus, forward 1'st speed is obtained under this condition.

In Forward 2'nd speed

When, under this condition, the third clutch C3 is disengaged and the fourth clutch C4 is engaged, the rotation power of the first ring gear 3R is directly transmitted to the output shaft 2. In this case, due to diengagement of the third clutch C3, the rotation of the second sun gear 4S has no effect on the rotation of the output shaft 2. Thus, the output shaft 2 is rotated in a normal direction at a second speed reduction ratio. Thus, forward 2'nd speed is obtained under this condition.

In Forward 3'rd speed

When, under this condition, the second clutch C2 is disengaged, the engine power of the input shaft 1 is transmitted to the second carrier 4C. In this condition, there are produced two ways for transmitting the rotation power of the second carrier 4C to the output shaft 2. That is, one of the ways consists of the second carrier 4C, the second ring gear 4R and the output shaft 2, and the other way consists of the second carrier 4C, the second sun gear 4S, the first carrier 3C, the first ring gear 3R, the fourth clutch C4 and the output shaft 2. Since the first sun gear 3S is fixed by the first brake B1, the output shaft 2 is rotated in a normal direction at a third speed reduction ratio. Thus, forward 3'rd speed is obtained under this condition.

In Forward 4'th speed

When, under this condition, the second clutch C2 is engaged and the fourth clutch C4 is disengaged, the second carrier 4C and the second sun gear 4S become rotated together with the input shaft 1. Due to interlocking of the second planetary gear set 4, the output shaft 2 is driven directly by the input shaft 1 to in a normal direction. Thus, forward 4'th speed is obtained.

In Forward 5'th speed

When, under this condition, the second clutch C2 is disengaged and the second brake B2 is engaged, the rotation power of the input shaft 1 is transmitted to the only the second carrier 4C. The first brake B1 is kept engaged. Due to engaged condition of the first and second brakes B1 and B2, the first sun gear 3S and the first ring gear 3R are fixed, and thus, the second sun gear 4S is fixed. Thus, the rotation power of the second carrier 4C, which is transmitted thereto from the input shaft 1, is transmitted through the second ring gear 4R to the output shaft 2. Thus, forward 5'th speed is obtained under this condition.

In Reverse

When the second clutch C2, the third clutch C3 and the second brake B2 are engaged, the rotation power of the input shaft 1 is transmitted through the second clutch C2 to second sun gear 4S. The second carrier 4C is engaged by the second brake B2 through the third clutch C3. Thus, under thise condition, the output shaft 2 is rotated in a reverse direction. That is, reverse mode is obtained.

As will be understood from Table-2, in the first embodiment, for carrying out the switch between any neighboring speeds, only two "ON-OFF" or "OFF-ON" switch operations are required by the associated clutches and brakes unlike the case of the above-mentioned conventional planetary gear drive. Thus, there is a reduction in shift shock of the associated transmission.

The planetary gear drive of the first embodiment 1 can also obtain the five forward speeds and one reverse by employing the clutch-brake operation modes shown in Table-3.

TABLE 3

| Speed selected | C1 | C2 | C3 | C4 | B1 | B2 |
| --- | --- | --- | --- | --- | --- | --- |
| Forward 1'st speed | x | o | o | x | o | x |
| Forward 2'nd speed | o | x | o | x | o | x |
| Forward 3'rd speed | o | x | x | o | o | x |
| Forward 4'th speed | o | o | x | x | (o) | x |
| Forward 5'th speed | o | x | x | x | o | o |

TABLE 3-continued

| Speed selected | C1 | C2 | C3 | C4 | B1 | B2 |
|---|---|---|---|---|---|---|
| Reverse | x | ○ | ○ | x | x | ○ |

Note:
○: ON (engaged)
x: OFF (disengaged)

Also in this case, only two "ON-OFF" or "OFF-ON" switch operations are required by the associated clutches and brakes for carrying out the switch between any neighboring speeds, unlike the case of the above-mentioned conventional planetary gear drive.

Figure 2:
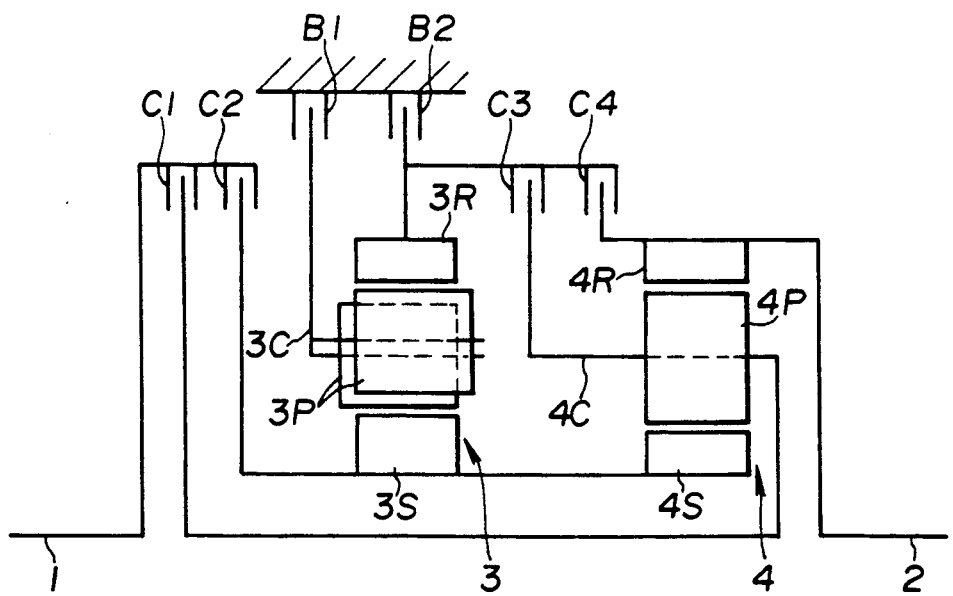
FIG. 2 is a view similar to FIG. 1, but showing a second embodiment of the present invention.

Referring to FIG. 2, there is shown a planetary gear drive of a second embodiment of the present invention.

Since the construction of this second embodiment is similar to that of the above-mentioned first embodiment, only parts which differ from those of the first embodiment will be described in the following.

That is, in the second embodiment, the second sun gear 4S is integrally connected with the first sun gear 3S, so that upon engagement of the second clutch C2, the first and second sun gears 3S and 4S become engaged with the input shaft 1. Furthermore, the first carrier 3C is arranged to be fixed upon engagement of the first brake B1.

Operation modes of the associated clutches and brakes of this second embodiment are shown in Table-4.

TABLE 4

| Speed selected | C1 | C2 | C3 | C4 | B1 | B2 |
|---|---|---|---|---|---|---|
| Forward 1'st speed | x | ○ | ○ | x | ○ | x |
| Forward 2'nd speed | x | ○ | x | ○ | ○ | x |
| Forward 3'rd speed | ○ | x | x | ○ | ○ | x |
| Forward 4'th speed | ○ | ○ | x | x | (○) | x |
| Forward 5'th speed | ○ | x | x | x | ○ | ○ |
| Reverse | x | ○ | ○ | x | x | ○ |

Note:
○: ON (engaged)
x: OFF (disengaged)

The planetary gear drive of this second embodiment can also obtain the five forward speeds and one reverse by employing the clutch-brake operation modes shown in Table-5.

TABLE 5

| Speed selected | C1 | C2 | C3 | C4 | B1 | B2 |
|---|---|---|---|---|---|---|
| Forward 1'st speed | x | ○ | ○ | x | ○ | x |
| Forward 2'nd speed | ○ | x | ○ | x | ○ | x |
| Forward 3'rd speed | ○ | x | x | ○ | ○ | x |
| Forward 4'th speed | ○ | ○ | x | x | (○) | x |
| Forward 5'th speed | ○ | x | x | x | ○ | ○ |
| Reverse | x | ○ | ○ | x | x | ○ |

Note:
○: ON (engaged)
x: OFF (disengaged)

Also in this case, only two "ON-OFF" or "OFF-ON" switch operations are required by the associated clutches and brakes for carrying out the switch between any neighboring speeds, unlike the case of the above-mentioned conventional planetary gear drive.

Figure 3:
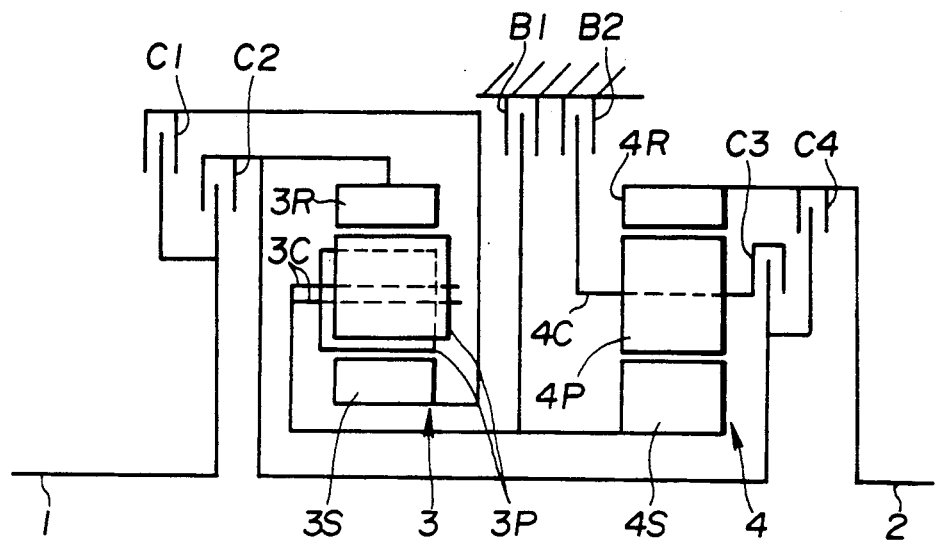
FIG. 3 is a view similar to FIG. 1, but showing a third embodiment of the present invention.
Figure 4:
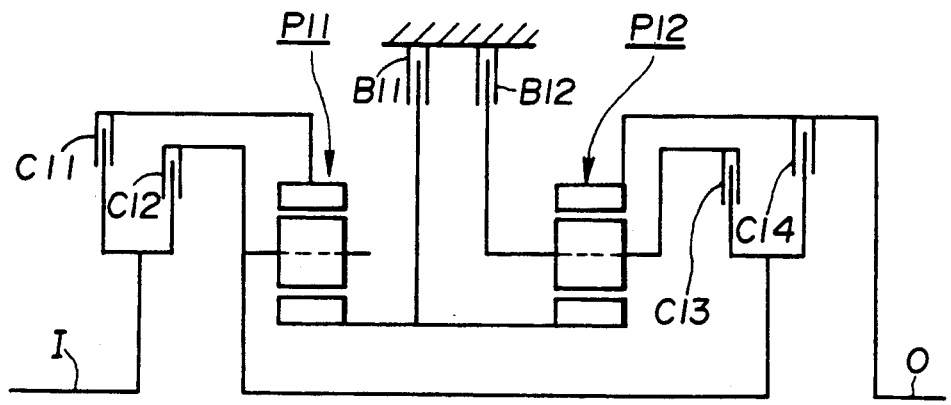
FIG. 4 is a view similar to FIG. 1, but showing a conventional planetary gear drive.

Referring to FIG. 3, there is shown a planetary gear drive of a third embodiment of the present invention.

In this embodiment, the first carrier 3C and the second sun gear 4S are integrally connected, so that upon engagement of the first brake B1, they become fixed. The first sun gear 3S is connectable to the input shaft 1 by means of the first clutch C1, and the first ring gear 3R is connectable to the input shaft 1 by means of the second clutch C2. The first ring gear 3R is connectable to the second carrier 4C by means of the third clutch C3, and connectable to the second ring gear 4R by means of the fourth clutch C4 thereby to connect the second ring gear 4R to the output shaft 2. With this, the second carrier 4C is fixble by means of the second brake B2.

Operation modes of the associated clutches and brakes of this third embodiment are shown in Table-6.

TABLE 6

| Speed selected | C1 | C2 | C3 | C4 | B1 | B2 |
|---|---|---|---|---|---|---|
| Forward 1'st speed | ○ | x | x | ○ | x | ○ |
| Forward 2'nd speed | ○ | x | ○ | x | x | ○ |
| Forward 3'rd speed | ○ | x | ○ | x | ○ | x |
| Forward 4'th speed | ○ | ○ | ○ | x | x | x |
| Forward 5'th speed | x | ○ | ○ | x | ○ | x |
| Reverse | ○ | ○ | x | x | x | ○ |

Note:
○: ON (engaged)
x: OFF (disengaged)

The planetary gear drive of this third embodiment can also have the five forward speeds and one reverse by employing the operation modes shown in Table-7.

TABLE 7

| Speed selected | C1 | C2 | C3 | C4 | B1 | B2 |
|---|---|---|---|---|---|---|
| Forward 1'st speed | ○ | x | x | ○ | x | ○ |
| Forward 2'nd speed | ○ | x | x | ○ | ○ | x |
| Forward 3'rd speed | ○ | x | ○ | x | ○ | x |
| Forward 4'th speed | ○ | ○ | ○ | x | x | x |
| Forward 5'th speed | x | ○ | ○ | x | ○ | x |
| Reverse | ○ | ○ | x | x | x | ○ |

Note:
○: ON (engaged)
x: OFF (disengaged)

As will be seen from Table-6 and Table-7, also in this third embodiment, only two "ON-OFF" or "OFF-ON" switch operations are required by the associated clutches and brakes for carrying out the switch between any neighboring speeds.

What is claimed is:

1. A multistage automatic transmission, comprising:
   input and output shafts being coaxially arranged;
   a first planetary gearset including a first sun gear, a first ring gear, mutually meshed paired pinions meshed with both said first sun gear and said first ring gear, and a first carrier rotatably carrying said mutually meshed paired pinions; and
   a second planetary gearset including a second sun gear, a second ring gear, a single type pinion meshed with both said second sun gear and said second ring gear, and a second carrier rotatably carrying said single type pinion, said first and second planetary gearsets being coaxially arranged in series between said input and output shafts,
   a first clutch through which said second carrier is engageable with said input shaft;
   a second clutch through which said first carrier is engageable with said input shaft, said first carrier being united with said second sun gear;
   a third clutch through which said first ring gear is engageable with said second carrier;
   a fourth clutch through which said first ring gear is engageable with said second ring gear, said second ring gear being united with said output shaft;
   a first brake for fixing said first sun gear in place; and
   a second brake for fixing said first ring gear in place.

2. A multistage automatic transmission, comprising:

input and output shafts being coaxially arranged;

a first planetary gearset including a first sun gear, a first ring gear, mutually meshed paired pinions meshed with both said first sun gear and said first ring gear, and a first carrier rotatably carrying said mutually meshed paired pinions; and a second planetary gearset including a second sun gear, a second ring gear, a single type pinion meshed with both said second sun gear and said second ring gear, and a second carrier rotatably carrying said single type pinion, said first and second planetary gearsets being coaxially arranged in series between said input and output shafts, a first clutch through which said second carrier is engageable with said input shaft;

a second clutch through which said first sun gear is engageable with said input shaft, said first sun gear being united with said second sun gear;

a third clutch through which said first ring gear is engageable with said second carrier;

a fourth clutch through which said first ring gear is engageable with said second ring gear, said second ring gear being united with said output shaft;

a first brake for fixing said first carrier in place; and a second brake for fixing said first ring gear in place.

3. A multistage automatic transmission, comprising: input and output shafts coaxially arranged;

a first planetary gearset including a first sun gear, a first ring gear, mutually meshed paired pinions meshed with both said first sun gear and said first ring gear, and a first carrier rotatably carrying said mutually meshed paired pinions; and a second planetary gearset including a second sun gear, a second ring gear, a single type pinion meshed with both said sun second gear and said second ring gear, and a second carrier rotatably carrying said single type pinion, said first and second planetary gearsets being coaxially arranged in series between said input and output shafts, a first clutch through which said first sun gear is engageable with said input shaft;

a second clutch through which said first ring gear is engageable with said input shaft;

a third clutch through which said second carrier is engageable with said first ring gear;

a fourth clutch through which said first ring gear is engageable with said output shaft, said second ring gear being united with said output shaft;

a first brake for fixing said first carrier in place, said first carrier being united with said second sun gear; and a second brake for fixing said second carrier in place.

* * * * *